(12) United States Patent
Mekid et al.

(10) Patent No.: US 12,496,625 B2
(45) Date of Patent: Dec. 16, 2025

(54) VESSEL CLEANING ROBOTIC SYSTEM

(71) Applicant: KING FAHD UNIVERSITY OF PETROLEUM AND MINERALS, Dhahran (SA)

(72) Inventors: Samir Mekid, Dhahran (SA); Ali Nasir, Dhahran (SA); Muhammad Faizan Mysorewala, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 32 days.

(21) Appl. No.: 18/621,246

(22) Filed: Mar. 29, 2024

(65) Prior Publication Data

US 2025/0281950 A1     Sep. 11, 2025

(51) Int. Cl.
*B08B 13/00*     (2006.01)
*B08B 9/08*     (2006.01)

(52) U.S. Cl.
CPC .......... *B08B 9/0813* (2013.01); *B08B 9/0808* (2013.01); *B08B 2209/08* (2013.01)

(58) Field of Classification Search
None
See application file for complete search history.

(56) References Cited

U.S. PATENT DOCUMENTS

| 9,205,470 | B2 | 12/2015 | Mcwhorter | |
| 2022/0026920 | A1* | 1/2022 | Ebrahimi Afrouzi | G06N 3/0495 |

FOREIGN PATENT DOCUMENTS

| CN | 201437247 U | 4/2010 |
| CN | 105170589 A | 12/2015 |
| CN | 105457960 A | 4/2016 |
| CN | 10-2209733 | 2/2021 |

OTHER PUBLICATIONS

Feller et al. ; Mechanical Design and Analysis of a Novel Three-Legged, Compact, Lightweight, Omnidirectional, Serial-Parallel Robot with Compliant Agile Legs ; MDPI Robotics, 11, 39 ; Mar. 24, 2022 ; 43 Pages.
Albitar et al. ; New concept of in-water surface cleaning robot ; Proceedings of 2013 IEEE International Conference on Mechatronics and Automation ; Aug. 4-7, 2013 ; 7 Pages.
Tuluc et al. ; The MopBot Cleaning Robot—An EPS@ISEP 2020 Project ; Springer Nature Switzerland AG ; 2021 ; 12 Pages.

(Continued)

*Primary Examiner* — Eric W Golightly
(74) *Attorney, Agent, or Firm* — Oblon, McClelland, Maier & Neustadt, L.L.P.

(57) ABSTRACT

A vessel cleaning robotic system includes a robotic cleaner having a cylindrical central unit from which three retractable legs extend. Each leg includes an omni-directional wheel at its distal end, a motor, up to three joints for articulation, and a collar for attachment to the central unit at a proximal end. An arm, also extending from the central unit, is configured to rotate around it, with a cleaning sub-unit at its distal end and a collar at its proximal end. The arm includes a vacuum pipe and a spraying device for cleaning purposes. Integrated within the retractable legs and the arm is a monitoring unit comprising sensors for operational monitoring.

20 Claims, 11 Drawing Sheets

(56) References Cited

OTHER PUBLICATIONS

Mahmud et al. ; Multi-objective Route Planning for Underwater Cleaning Robot in Water Reservoir Tank ; Journal of Intelligent & Robotic Systems 101:9 ; Dec. 10, 2020 ; 16 Pages.
Ramirez-Pena et al. ; Determination of Requirements for the Improvement of Occupational Safety in the Cleaning of Vertical Tanks of Petroleum Products ; MDPI safety 9, 6 ; Feb. 2, 2023 ; 20 Pages.
Mikolajczyk et al. ; Recent Advances in Bipedal Walking Robots: Review of Gait, Drive, Sensors and Control Systems ; MDPI sensors 22 ; Jun. 12, 2022 ; 31 Pages.
Poggi et al. ; Recent developments in remote inspections of ship structures ; International Journal of Naval Architecture and Ocean Engineering 12 ; Nov. 11, 2020 ; 11 Pages.
Chiang et al. ; Posture control for humanoid robot on uneven ground and slopes using inertial sensors ; Advances in Mechanical Engineering, vol. 12(9) ; Aug. 17, 2020 ; 14 Pages.
Chrysalidis et al. ; Applied Cleaning Methods of Oil Residues from Industrial Tanks ; MDPI processes 8 ; May 11, 2020 ; 27 Pages.

\* cited by examiner

VESSEL CLEANING ROBOTIC SYSTEM

CROSS REFERENCE TO RELATED APPLICATION

The present disclosure claims the benefit of Saudi Patent Application No. 1020241241 filed on Mar. 11, 2024, with the Saudi Authority for Intellectual Property Office, which is incorporated herein by reference in its entirety.

BACKGROUND

Technical Field

The present disclosure is directed to robotic cleaning systems, particularly to an automated robotic system for the cleaning of vessel tanks used in oil-water-gas separation processes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In oil and gas plants, large sized vessel are used as storage tanks. These vessels are typically made of carbon steel and last for many years. These vessel tanks need internal inspection and cleaning on a regular basis. Large-scale industrial cleaning of the vessel tanks involves removing various types of residues, including oil, sludge, and sediments, from the interior surfaces of storage tanks. These residues pose significant challenges due to their chemical composition, viscosity, and the tendency to adhere strongly to the surfaces of storage tanks. Over the years, there have been introductions of various mechanical, chemical, and manual cleaning methods in the oil and gas industry. These methods range from simple manual scraping and washing techniques to more sophisticated methods involving high-pressure water jets, chemical cleaning agents, and automated machinery designed to enter and clean the tanks.

Despite these technological advancements, the state of the art in vessel tank cleaning faces significant challenges. One primary challenge is the inherent risk to human workers who are often required to enter the confined and hazardous spaces, exposing them to toxic substances and potentially dangerous conditions. The complexity of cleaning the large tanks with intricate internal structures also poses a challenge, as reaching all areas effectively can be difficult. Furthermore, the use of chemicals and large volumes of water in traditional cleaning processes raises environmental concerns. These factors, combined with the time-consuming nature of existing cleaning methods, lead to increased operational downtime and higher costs.

Some solutions have been developed to address the aforementioned challenges. For instance, CN 105457960A discloses a large, sealed storage container cleaning intelligent robot. This publication describes a system comprising a control system, a power system, a transmission system, and a cleaning system, all interconnected. The transmission system includes a support frame, a main transmission device, hoisting mechanism, rotary mechanism, stretching mechanism, and at least one mechanical arm equipped with a cleaning device. The mechanical arm, featuring a transmission arm motor and several hinged movable arms, is designed to clean the inner cavity of a storage container. A cleaning system having a cylindrical central unit with retractable and extendable legs and capability to integrate a jetting nozzle with a plurality of sensors is not disclosed.

U.S. Pat. No. 9,205,470B2 describes a robotic tank cleaning device and a method for cleaning a tank. A robotic body equipped with at least one motor attached to at least one wheel and a cleaning head attached to the robotic body is described. The method provides for a maneuverable robotic device capable of entering a tank through a standard entry point. However, a cleaning system having a cylindrical central unit with retractable and extendable legs and capability to integrate a jetting nozzle with a plurality of sensors is not disclosed.

Accordingly, it is one object of the present disclosure to provide a solution for cleaning vessel tanks that addresses the shortcomings of existing techniques by minimizing or eliminating the need for human entry into hazardous environments, ensuring thorough and consistent cleaning of complex tank structures, reducing the use of hazardous chemicals, and minimizing operational downtime. The present disclosure includes integration of remote monitoring system and automated control system to a robotic cleaning device for enhanced efficiency of cleaning operations in an oil vessel tank which reduces the need for human entry into hazardous environments and improves the overall safety of the cleaning process.

SUMMARY

In an exemplary embodiment, a vessel tank vessel tank cleaning system is provided. The vessel tank cleaning system comprises a robotic cleaner. The robotic cleaner comprises a cylindrical central unit. The robotic cleaner further comprises three retractable legs extending from the central unit. Herein, each of the retractable legs comprises an omni directional wheel at a distal end, a collar at an end proximal to the central unit, up to three joints and a motor. The robotic cleaner further comprises an arm extending from the central unit configured to rotate about the central unit. Herein, a distal end of the arm comprises a cleaning sub-unit, an end proximal to the central unit comprises a collar. Further, herein, a vacuum pipe and a spraying device are connected to the arm. In the robotic cleaner, each of the retractable legs and the arm are attached to the central unit by the collar. Herein, the collars of the retractable legs and the arm are positioned over the central unit. The vessel tank cleaning system further comprises a monitoring unit integrated in the retractable legs and the arm of the robotic cleaner, and comprising a plurality of sensors. Herein, the monitoring unit includes a controller having a processor with instructions configured to monitor operation of the robotic cleaner. The vessel tank cleaning system further comprises a control unit integrated in the central unit of the robotic cleaner and connected to the monitoring unit. Herein, the instructions of the processor are configured to communicate with the monitoring unit and control movement of the robotic cleaner. The vessel tank cleaning system further comprises a control terminal configured to communicate with the control unit of the robotic cleaner through a control cable. Herein, the control cable extends from the control terminal to the central unit. The vessel tank cleaning system further comprises a pump connected to the arm of the robotic cleaner through a fluid hose and a vacuum hose.

In some embodiments, the motor on each of the retractable legs of the robotic cleaner is coupled to an encoder.

In some embodiments, the control unit of the robotic cleaner is configured to communicate with the encoder.

In some embodiments, the plurality of sensors of the monitoring unit includes force sensors integrated in each of the retractable legs of the robotic cleaner.

In some embodiments, the plurality of sensors of the monitoring unit comprises a set of inertial sensors. Herein, the inertial sensors are integrated in the retractable legs. Further, the processor is further configured with instructions to control a position of the retractable legs. In some embodiments, the plurality of sensors of the monitoring unit comprises an image sensor integrated in the arm of the robotic cleaner. The processor of the control unit is further configured with instructions to monitor a position of the arm with the image sensor.

In some embodiments, the plurality of sensors of the monitoring unit comprises a set of displacement sensors. The processor of the control unit is further configured with instructions to monitor a movement of the robotic cleaner.

In some embodiments, the plurality of sensors of the monitoring unit comprises a set of IR sensors.

In some embodiments, the arm of the robotic cleaner comprises four joints wherein each joint provides a degree of rotation.

In some embodiments, the arm and the retractable legs are rotational 360-degree around an axis of the central unit.

In some embodiments, the cleaning sub-unit of the arm comprises a scraper and a degreaser.

In some embodiments, the spraying device at the arm of the robotic cleaner is connected to the pump through the fluid hose. Herein, a first end of the fluid hose is connected to the pump and a second end is connected to an inlet of the spraying device.

In some embodiments, the vacuum pipe at the arm of the robotic cleaner is connected to the pump through the vacuum hose. Herein, a first end of the vacuum hose is connected to the pump and a second end is connected to the vacuum pipe.

In some embodiments, the central unit of the robotic cleaner is an elongated cylindrical unit, with the retractable legs and the arm extending from the elongated cylindrical unit along the same axis.

In some embodiments, the central unit of the robotic cleaner comprises an actuator.

In some embodiments, the control unit comprises an energy management sub-unit and a lighting sub-unit.

In some embodiments, the control unit comprises a decision support sub-unit configured to perform fault checking of a plurality of components of the robotic cleaner.

In some embodiments, the decision support sub-unit is further configured to isolate one or more components having a fault.

In some embodiments, the control unit comprises a safety check sub-unit comprising an overheat protector and a short-circuit protector.

In some embodiments, the control terminal is configured to have a two-way communication with the control unit.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
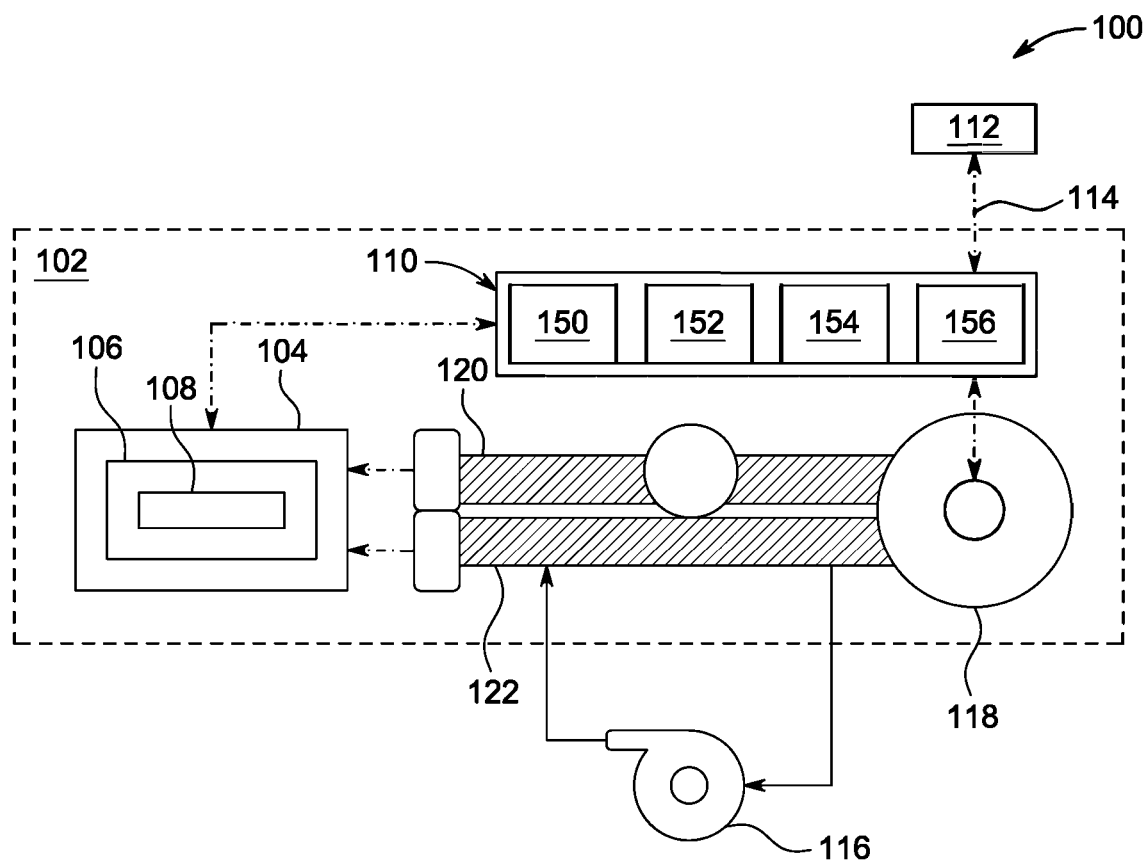
FIG. 1 is an exemplary schematic block diagram of a vessel tank cleaning system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a vessel tank cleaning robotic system for maintenance and cleaning of large storage tanks, particularly in industries such as oil and gas. The vessel tank cleaning robotic system preferably integrates advanced robotics, precise control mechanisms, and multiple sensors for a fully automated, robotic approach to tank cleaning that includes testing a validation of the robotic system. In particular, the vessel tank cleaning robotic system includes a robotic cleaner with adaptable mobility, capable of navigating and operating within complex tank structures. The vessel tank cleaning robotic system significantly reduces the need for hazardous manual labor and also ensures a level of operational efficiency and safety by following a cleaning protocol based on commercial standards, while providing environmental sustainability, overcoming limitations of conventional methods for industrial tank cleaning. The vessel tank cleaning robotic system performs detection, isolation and response actions to various predetermined ad unknown fault conditions using sensors and timers.

Figure 5:
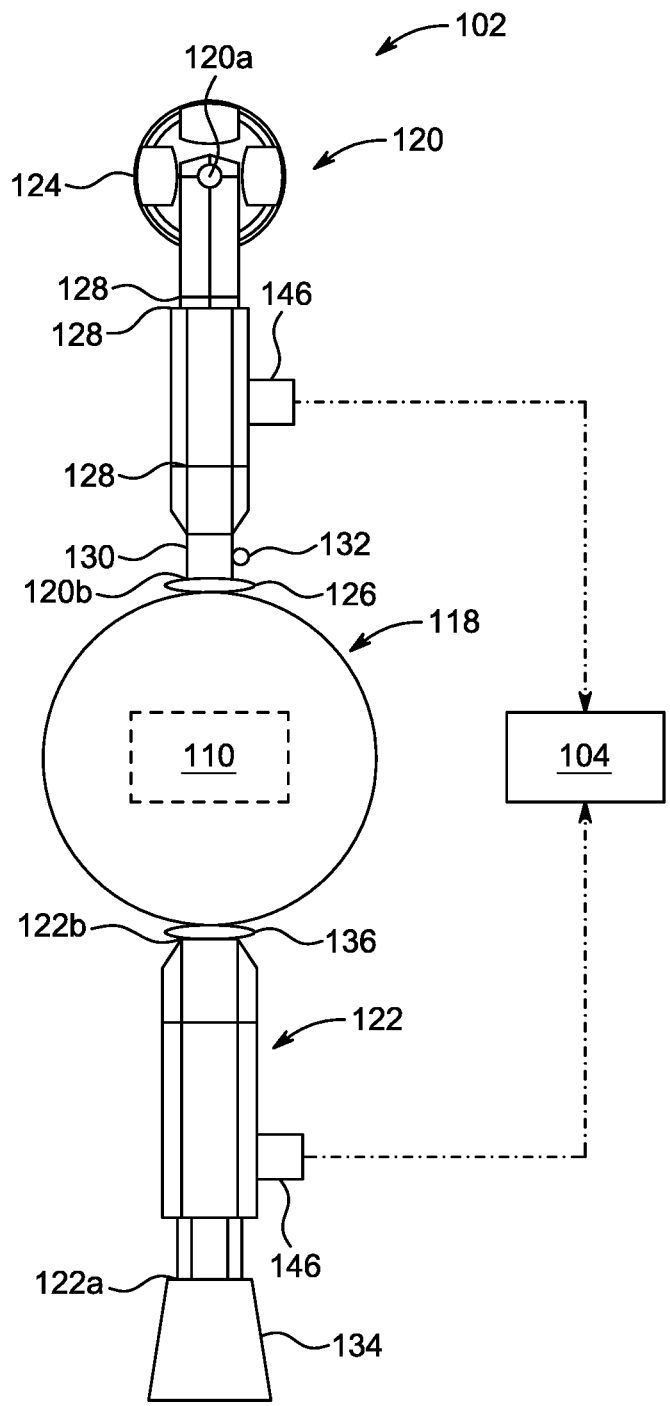
FIG. 5 is an exemplary simplified depiction of the robotic cleaner, according to certain embodiments.
Figure 6:
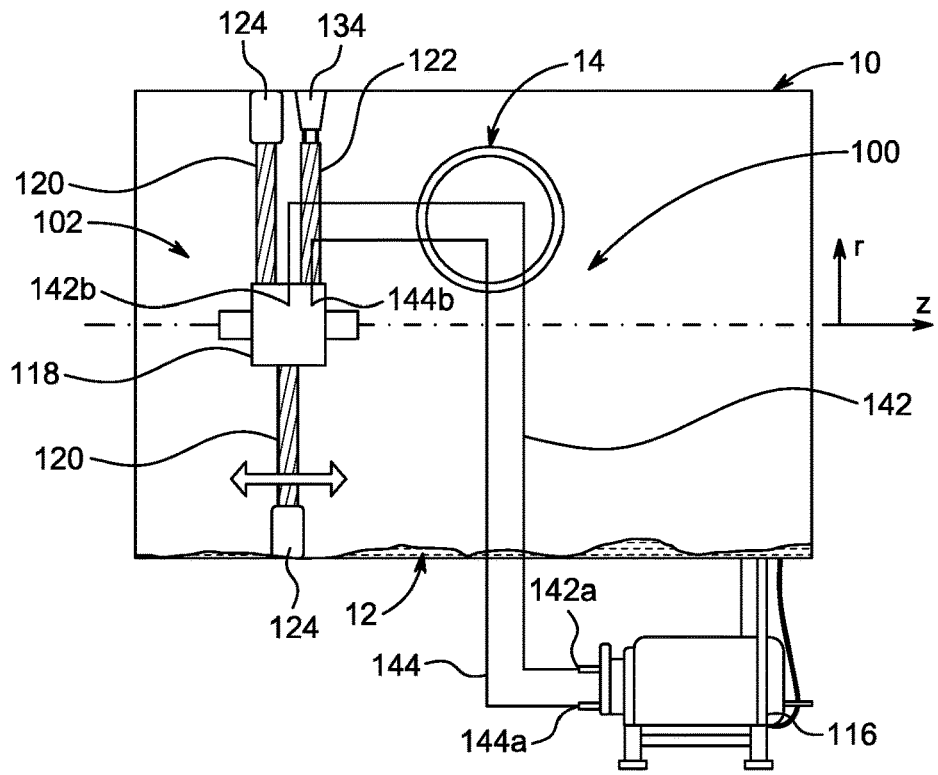
FIG. 6 is an exemplary side planar schematic of the vessel tank cleaning system during operation in an oil vessel, according to certain embodiments.

Referring to FIG. 1, illustrated is a schematic block diagram view of a vessel tank cleaning robotic system, as represented by reference numeral 100 (and thus, hereinafter, sometimes, interchangeably referred to as "vessel tank cleaning system 100" without any limitations) of the present disclosure. The vessel tank cleaning system 100 provides a robotic solution for cleaning of industrial tanks, particularly for industries such as oil and gas. In particular, the vessel tank cleaning system 100 provides an integrated approach that combines advanced robotics with precise control and monitoring capabilities to automate the cleaning of oil vessels used in oil-water separation (as depicted in FIGS. 5 and 6, and discussed later in more detail).

As illustrated, the vessel tank cleaning system 100 includes a robotic cleaner 102. In the present disclosure, the robotic cleaner 102 is the automated device that can enter a vessel tank for cleaning the entire volume of the vessel tank. The robot cleaner 102 has a central unit 118. The central unit 118 forms the core of the robotic cleaner 102, housing the primary operational and control components. The central unit 118 is designed to be capable of withstanding the harsh environmental conditions within oil tanks. The movement of the central unit 118 within the vessel tank is supported by a group of legs (shown as one leg 120 in FIG. 1 for simplicity) extending from the central unit 118. In addition, the central unit 118 has a rotational arm 122 for cleaning the internal surface of the vessel tank. In particular, the rotational arm 122 includes a mopping device and jetting nozzles. The vessel tank cleaning system 100 further includes a pump 116, located external to the robotic cleaner 102, and connected to the rotational arm 122 of the robotic cleaner 102 through one or more hoses. In particular, the pump 116 is connected to the mopping device and the jetting nozzles of the rotational arm 122. The robotic cleaner 102 is integrated with a monitoring unit 104. In particular, the monitoring unit 104 includes a controller 106 having a processor 108 with instructions configured to monitor operation of the robotic cleaner 102. The robotic cleaner 102 further includes a control unit 110 connected to the monitoring unit 104. Herein, the instructions of the processor 108 are configured to communicate with the monitoring unit 104 and control movement of the robotic cleaner 102. The control unit 110 of the vessel tank cleaning system 100 may include several sub-units that enhance the functionality and safety of the robotic cleaner 102, such as, energy management sub-unit 150, lighting sub-unit 152, decision support sub-unit 154, and safety check sub-unit 156. The vessel tank cleaning system 100 also includes a control terminal 112 configured to communicate with the control unit 110 of the robotic cleaner 102 through a control cable 114. The details of each of these components, shown in FIG. 1, are provided further in the proceeding paragraphs.

Figure 2:
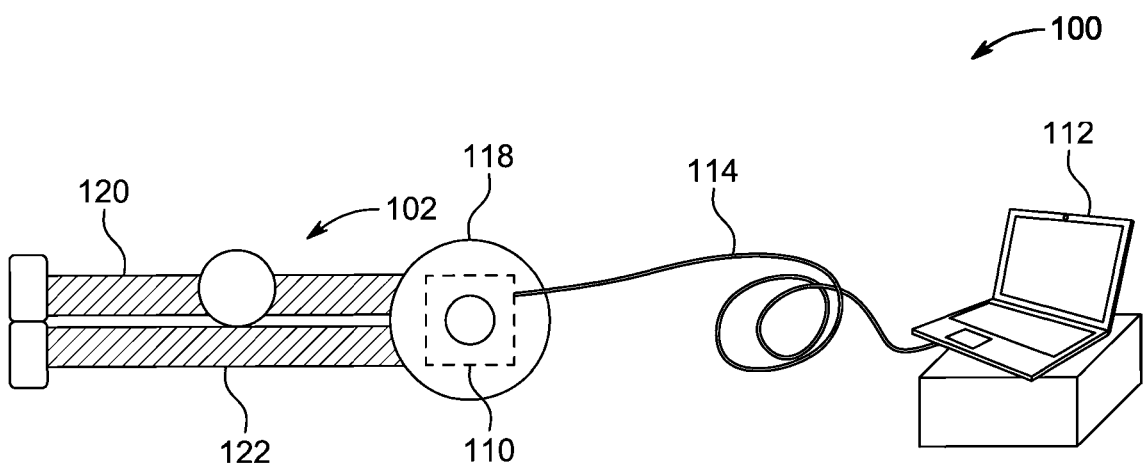
FIG. 2 is an exemplary simplified schematic diagram of the vessel tank cleaning system, according to certain embodiments.

Referring to FIG. 2, illustrated is a simplified high-level schematic of the vessel tank cleaning system 100 depicting the control unit 110 of the robotic cleaner 102 in communication with the control terminal 112. Herein, the control unit 110 of the robotic cleaner 102 is disposed in communication with the control terminal 112 through a control cable 114. The control terminal 112 may be operated by an operator to control the operations and general movement of the robotic cleaner 102. In the present embodiments, the control terminal 112 is configured to have a two-way communication with the control unit 110. This way the operator may send control instructions, via the control terminal 112, to the control unit 110 for controlling operations of the robotic cleaner 102; and may further receive data, such as data indicative of status of operations of the robotic cleaner 102, in the control terminal 112. In the present illustration, the control terminal 112 is represented as a computer (laptop); however, it may be appreciated that the control terminal 112 may be implemented as any suitable computing device for present purposes (as discussed later in more detail) without any limitations. The control unit 110, as discussed, is integrated in the central unit 118 of the robotic cleaner 102. In particular, the control unit 110 may be housed inside the central unit 118. In an example, the control unit may be a circuitry configured to have a two-way communication with the control terminal 112. Housing the control unit 110 inside the central unit 118 may protect circuitry of the control unit 110 when the robotic cleaner 102 is performing cleaning operation inside the vessel tank. Further, as shown in FIG. 2, the control terminal 112 is connected to the control unit 110 through a control cable 14, i.e., the control cable 114 extends from the control terminal 112 to the central unit 118, The control cable 114 may be in the form of a flexible, long cable used typically for communication, capable of carrying control instructions. The control cable 114 extends from the control terminal 112, which may usually be located outside of the vessel tank, as being controlled by an operator, to the central unit 118, passing through an entry of the vessel tank, located inside the vessel tank during operation of the robotic cleaner 102. The control cable 114 transmits the control instructions from the control terminal 112 to the control unit 110 integrated with the central unit 118, for controlling operation of the robotic cleaner 102.

Figure 3:
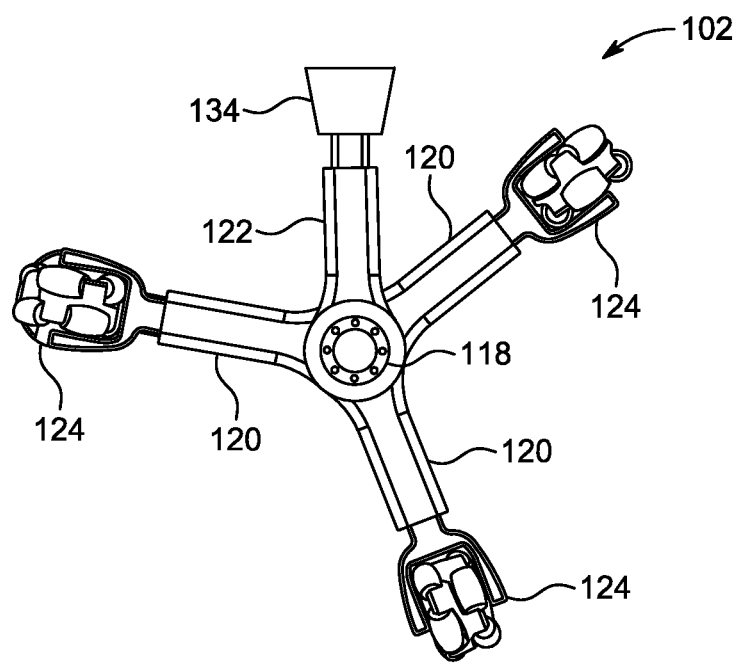
FIG. 3 is an exemplary diagrammatic front planar view of a robotic cleaner of the vessel tank cleaning system, according to certain embodiments.
Figure 4:
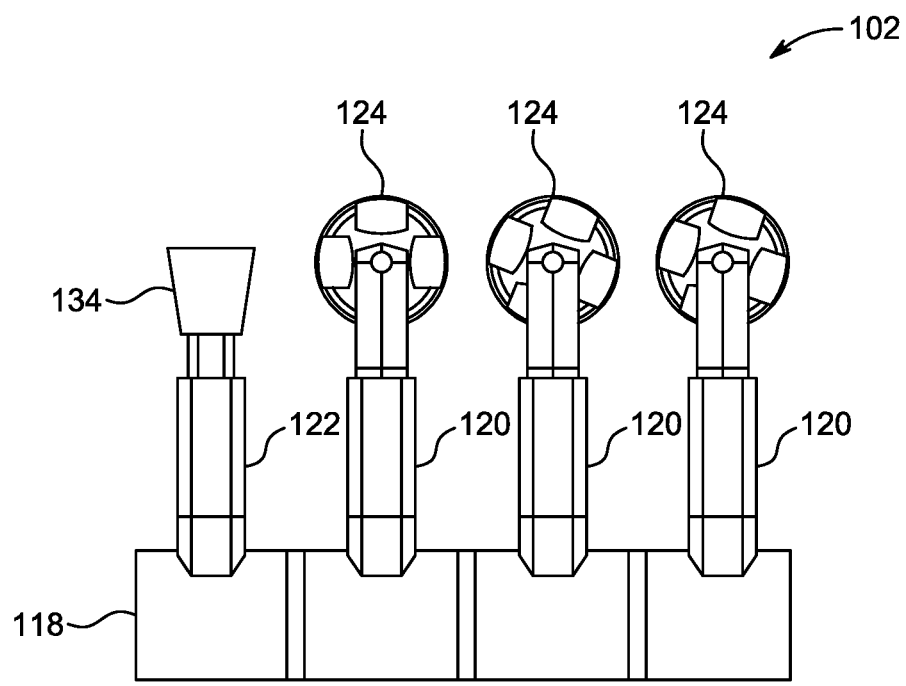
FIG. 4 is an exemplary diagrammatic side planar view of the robotic cleaner, according to certain embodiments.

Referring to FIGS. 3, illustrated is a diagrammatic front planar view of the robotic cleaner 102. FIG. 4 illustrates a side planar view of the robotic cleaner 102. As illustrated, the robotic cleaner 102 primarily includes a central unit 118, a group of retractable legs 120, for example, three retractable legs as shown in FIG. 3 and an arm 122. The central unit 118 as shown in FIG. 4 is an elongated structure, typically a cylindrical structure (hereinafter, sometimes, referred to as "cylindrical central unit 118" without any limitations). In the present embodiments, the central unit 118 of the robotic cleaner 102 is an elongated cylindrical unit, with three retractable legs 120. It is to be noted that the three retractable legs 120 are similar in their physical properties, such as, for example, the length, shape, circumference, etc., however, they are also distinct because they are arranged in tandem in a specific order on the cylindrical central unit 118, as shown in FIG. 4, the retractable legs 120 could be 120-1, 120-2, 120-3 (the reference numerals not shown in FIG. 3 and FIG. 4). Each of the three retractable legs 120 may have the capability to move separately based on the positioning of the robotic cleaner 102. The elongated cylindrical unit further has an arm 122 extending from the elongated cylindrical unit 118 along a central axis, as shown in FIG. 4. The elongated structure of the central unit 118 provides a balance and distribution of weight, for maintaining stability for the robotic cleaner 102 during the cleaning operation. The cylindrical shape of the central unit 118 also facilitates smooth rotation and movement for the robotic cleaner 102, for maneuvering within the confined and complex spaces of the oil vessel 10. Herein, the alignment of the retractable legs 120 and the arm 122 along the same axis ensures a balanced design. This allows for the retractable legs 120 and the arm 122 to deploy and retract without interfering with each other. Further, herein, the arm 122 and the retractable legs 120 are rotational 360-degree around an axis of the central unit 118. This rotational capability greatly enhances the flexibility and reach of the robotic cleaner 102. For the arm 122, 360-degree rotation means it can access and clean all areas of the vessel tank without the need for the entire robotic cleaner 102 to reposition itself. Similarly, the 360-degree rotation of the retractable legs 120 enables the robotic cleaner 102 to maneuver effectively within the vessel tank, allowing for precise positioning as may be required during the cleaning process.

In the present embodiment, the robotic cleaner 102 includes three retractable legs 120 extending from the central unit 118 as shown in FIG. 3 and FIG. 4. The robotic cleaner 102 includes three retractable legs for a standard vessel tank. In an example, for a vessel tank with larger or more complex internal space, the robotic cleaner 102 may include more than three legs, i.e., six or even up to 12 retractable legs 120 for the arm 122 to reach all corners of a complex vessel tank. The legs 120 are retractable, meaning the legs are designed to be extended or retracted as needed, for navigating the various contours and obstacles within the vessel tank 10. The retractable legs 120 have an elongated shaft like structure. In an embodiment, the elongated shaft (retractable leg 120) may be narrow. In an embodiment, the elongated shaft (retractable leg 120) may have a wider inner diameter. In an embodiment, the retractable leg 120 may be hollow. In an embodiment, the retractable leg 120 may be a solid (not hollow) elongated shaft.

FIG. 5 illustrates a detailed diagrammatic view of the robotic cleaner 102, depicting its various components, while showing only one retractable leg 120 for simplicity and clarity. Each of the retractable legs 120 has a distal end 120a (i.e., the end farthest from where the corresponding retractable leg 120 connects to the central unit 118) and a proximal end 120b (i.e., the end closest to the central unit 118). In general, each of the three retractable legs 120 are identical in design and configuration for purposes of the present disclosure. The retractable legs 120 provide stability and adaptability to the robotic cleaner 102, when in operation. Each of the retractable legs 120 includes an omni directional wheel 124 at the distal end 120a. The omni directional wheels 124, as employed, are wheels capable of moving in multiple directions, not just forward and backward. Each retractable leg 120, fitted with the omni directional wheel 124, allows for movement of the robotic cleaner 102 in various directions, for navigating the complex inner surfaces of the vessel tank, enhancing the overall mobility of the robotic cleaner 102. Also, each of the retractable legs 120 is connected to the central unit 118 through a collar 126 or a leg collar 126 at the proximal end 120b. The collars 126 serves as connecting points between each corresponding retractable leg 120 and the central unit 118. The collar 126 also plays a role in the retracting mechanism of the corresponding retractable leg 120, allowing the retractable leg 120 to extend or retract smoothly while maintain a secure connection with the central unit 118 during operation. Further, each of the retractable legs 120 includes joints (as generally represented by reference numeral 128). Each retractable legs 120 may include multiple joints, for example, up to three joints 128. The inclusion of the multiple joints 128 in each retractable leg 120 adds a significant degree of flexibility and articulation. This feature enables each of the retractable legs 120 to bend at the multiple joints 128 in order to bend (curl) the retractable leg 120 inward or outward as may be required for adjusting the stance and position of the robotic cleaner 102 to conform to the internal structure of the vessel tank. This adaptability ensures that the robotic cleaner 102 can reach all areas inside the vessel tank. Furthermore, each of the retractable legs 120 includes a motor 130. The motor 130 in each retractable leg 120 may control the extension, retraction, and articulation of the corresponding retractable leg 120, allowing for precise and controlled movement. This provides the robotic cleaner 102 with the ability to position itself optimally within the oil vessel tank for effective cleaning. The motor 130 in each retractable leg 120 contributes to the autonomous nature of the robotic cleaner 102, reducing the need for manual adjustment and intervention. The motor 130 is typically a servo motor or a stepper motor, which receive control signals as input to function. When a servo motor or a stepper motor is commanded to move, it will move to the position and hold that position. In an embodiment, instructions from the monitoring unit or the control unit is used as control signals for the motor 130, in order to move the retractable legs 120. In an example, the motor 130 can be a DC motor.

In some embodiments, as better illustrated in FIG. 5, the motor 130 on each of the retractable legs 120 of the robotic cleaner 102 is coupled to an encoder 132. As discussed, the primary function of the motors 130 is to control the movement of the retractable legs 120. This includes extending, retracting, and maneuvering the retractable legs 120 to facilitate the navigation and stability of the robotic cleaner 102 within the oil vessel 10. The encoder 132, as employed, converts motion (as provided by the corresponding motor 130) into an electrical signal, which may be transmitted to a control circuitry of the robotic cleaner 102. In present embodiment, the control unit 110 of the robotic cleaner 102 is configured to communicate with the encoder 132 (i.e., each of the encoders 132). In some examples, the encoders 132 may transmit their readings to the monitoring unit 104 integrated in the retractable legs 120 of the robotic cleaner 102, which, in turn, may transmit these readings to the control unit 110 of the robotic cleaner 102. In present configuration, the encoders 132 may provide feedback on the position of each retractable leg 120. This information may be utilized to understand how much each leg has extended or retracted and its current position. The encoder 132 may also monitor the speed at which the corresponding motor 130 of the retractable leg 120 is operating. This allows control of the speed of movement of the retractable leg 120, ensuring smooth and controlled navigation. It may be contemplated that with each retractable leg 120 having the motor 130 and the encoder 132, the control unit 110 can synchronize the movement of all of the retractable legs 120, for coordinated movement of the robotic cleaner 102, especially for maintaining balance and stability while navigating uneven surfaces inside the vessel tank.

The robotic cleaner 102 further includes the arm 122 extending from the central unit 118, as shown in FIG. 3, FIG. 4, and FIG. 5. The arm 122 is a structural element of the robotic cleaner 102, extending outward from the central unit 118. The primary role of the arm 122 is to perform the actual (e.g., direct contact) cleaning tasks within the vessel tank. The design of the arm 122 allows it to reach various parts of the vessel tank. The arm 122 is configured to rotate about the central unit 118. This rotational capability provides the arm 122 with the flexibility to maneuver around the central unit 118. In particular, the rotation adds to the efficiency and effectiveness of the cleaning process by allowing the arm 122 to access and clean various angles and corners of the oil vessel 10. This enables the arm 122 to cover a wide area within the oil vessel tank, reaching different sections without the need for the entire robotic cleaner 102 to reposition itself.

As illustrated in FIG. 5, the arm 122 has a distal end 122a (i.e., the end farthest from where the arm 122 connects to the central unit 118) and a proximal end 122b (i.e., the end closest to the central unit 118). As shown, the distal end 122a of the arm 122 includes a cleaning sub-unit 134. The cleaning sub-unit 134 is the component that directly engages with interior of the oil vessel tank for cleaning. The cleaning sub-unit 134 may include various cleaning tools and mechanisms, such as brushes, scrapers, nozzles for spraying cleaning agents, or suction devices for removing residues. The configuration of the cleaning sub-unit 134 is designed to effectively remove sludge, oil residues, and other contaminants from the surfaces of the vessel tank. Further, the end 122b proximal to the central unit 118 includes a collar or an arm collar 136. The collar 136 serves as a junction or connection between the arm 122 and the central unit 118. The collar 136 is also integral to rotational mechanism of the arm 122, providing a stable and secure connection that allows the arm 122 to rotate smoothly while maintaining its attachment to the central unit 118. In some examples, the collar 136 may include bearings or other mechanical components that facilitate the smooth rotation of the arm 122.

As better illustrated in FIG. 5, each of the retractable legs 120 and the arm 122 are attached to the central unit 118 by the collars 126, 136. Herein, the collars 126 and 136 of the retractable legs 120 and the arm 122, respectively, are positioned over the central unit 118. This design configuration helps with the overall stability, mobility, and operational efficiency of the robotic cleaner 102. The collars 126, 136 are designed to allow for both secure attachment and the movement necessary for the operation of the retractable legs 120 and the arm 122. As discussed, the retractable legs 120 and the arm 122 are each connected to the central unit 118 of the robotic cleaner 102, with the central unit 118 acting as the core or the main body of the robotic cleaner 102, from which these components extend. The connection provided by the collars 126, 136 ensures that both the retractable legs 120 and the arm 122 are securely attached to the central unit 118 while allowing for the necessary movement and flexibility required for their functions. In the case of the retractable legs 120, the collars 126 enable them to extend, retract, and possibly rotate or articulate as needed for maneuverability. For the arm 122, the collar 136 allows for rotational movement of the arm 122 for effectively performing the cleaning of entire circumferences along planes of inner surfaces of the oil vessel 10.

Further the arm 122 of the robotic cleaner 102 comprises multiple joints (not shown). Herein, each joint provides a degree of rotation. The incorporation of multiple joints in the design of the arm 122 is aimed at enhancing flexibility and reach of the arm 122, similar to the multiple joints of the three retractable legs 120. The multiple joints of the arm 122 may have the capability to bend individually so as to promote bending/curling of the arm 122 inward or outward as to position the arm 122 for cleaning. The multiple joints promote the moving of the arm 122 to clean all corners of the oil vessel 10. In an embodiment, the arm 122 comprises two, three or up to four joints. Each of these multiple joints provides a degree of rotation, this adds a level of dexterity to movements of the arm 122. The rotation at each joint of the multiple joints means that the arm 122 can bend and twist in various directions, allowing it to adjust its angle and position as required for effective cleaning.

In some embodiments, the central unit 118 of the robotic cleaner 102 comprises an actuator (not shown). The actuator may be responsible for providing mechanical power for the operation of various parts of the robotic cleaner 102. The actuator within the central unit 118 may also be responsible for converting control signals received from processor 108 into appropriate mechanical motion. The actuator may facilitate various types of motion, including linear and rotational movements. For instance, the actuator may extend or retract the retractable legs 120, rotate the arm 122 or adjust its angle, and possibly control other mechanical components necessary for the cleaning process, in the robotic cleaner 102. Further, the monitoring unit 104 is integrated in the retractable legs 120 and the arm 122 of the robotic cleaner 102 (schematically illustrated in FIG. 5). As discussed, the monitoring unit 104 is configured to monitor operation of the robotic cleaner 102. For this purpose, the monitoring unit 104 includes a plurality of sensors (as represented by reference numeral 146 in FIG. 5) that are placed at varied positions on the retractable legs 120 and on the arm 122.

In an embodiment, the plurality of sensors 146 of the monitoring unit 104 includes force sensors integrated in each of the retractable legs 120 of the robotic cleaner 102. In an embodiment, a group of force sensors may be attached at multiple positions, at a distance from each other, and on all sides of the retractable legs 120. The group of sensors may be attached to an internal surface of the shaft like structure of the retractable legs 120. In an example, the group of sensors may be attached to the retractable legs 120 externally. These force sensors may be configured for assessing the contact pressure exerted by the retractable legs 120 on surfaces of the oil vessel 10. This information may be utilized for maintaining the stability of the robotic cleaner 102 as it navigates the interior of the oil vessel 10. By constantly monitoring the force exerted, the monitoring unit 104 can adjust the extension or retraction of the retractable legs 120 to ensure optimal grip and balance, preventing slips or falls that could disrupt the cleaning process or damage interior of the oil vessel 10. In another embodiment, the plurality of sensors 146 of the monitoring unit 104 comprises a set of inertial sensors. Herein, the inertial sensors are integrated in the retractable legs 120. In an embodiment, a group of inertial sensors may be attached. These inertial sensors may be configured for detecting changes in movement and orientation of the retractable legs 120, providing data on the position of the robotic cleaner 102 within the oil vessel 10. The processor 108 is further configured with instructions to control the position of the retractable legs 120. This control helps in navigating complex tank environments, allowing for adjustments in stance and movement of the robotic the cleaner 102 to optimize cleaning coverage and maneuverability. In yet another embodiment, the plurality of sensors 146 of the monitoring unit 104 comprises an image sensor integrated in the arm 122 of the robotic cleaner 102. The image sensor is attached to an external surface of the arm 122, such that, the image sensor can capture images of internal space of the oil vessel 10. The image sensor may be configured for visual monitoring, providing real-time imagery of position of the arm 122 and the areas it is cleaning. Herein, the processor of the control unit (which may be same as the processor 108) is further configured with instructions to monitor the position of the arm 122 with the image sensor. The processor 108 of the control unit 110 uses the data from the image sensor to adjust the position of the arm 122, ensuring it reaches and effectively cleans all required areas of the oil vessel 10. In still another embodiment, the plurality of sensors 146 of the monitoring unit 104 comprises a set of displacement sensors. The set of displacement sensors may be configured for tracking the movement of the robotic cleaner 102 within the oil vessel 10. In an embodiment, the displacement sensors may be attached to a top side of the central unit 118. Herein, the processor 108 of the control unit 110 is further configured with instructions to monitor a movement of the robotic cleaner 102. That is, the data gathered by the set of displacement sensors is processed to monitor progress and path of the robotic cleaner 102, ensuring that it covers the entire interior surface of the oil vessel 10 without unnecessary repetition or missed spots. In still another embodiment, the plurality of sensors 146 of the monitoring unit 104 comprises a set of IR (infrared) sensors. These IR sensors (or alternatively, ultrasonic sensors) are particularly useful for detecting obstacles, measuring distances, and assessing internal conditions of the oil vessel 10, such as presence of the sludge 12 on its internal surfaces. In an embodiment, the IR sensors are located on the retractable legs 120, the arm 122 and the central unit 118. In general, the integration of the plurality of sensors 146 based on such diverse technologies with the monitoring unit 104 of the robotic cleaner 102 enhances its functionality significantly.

Figure 7:
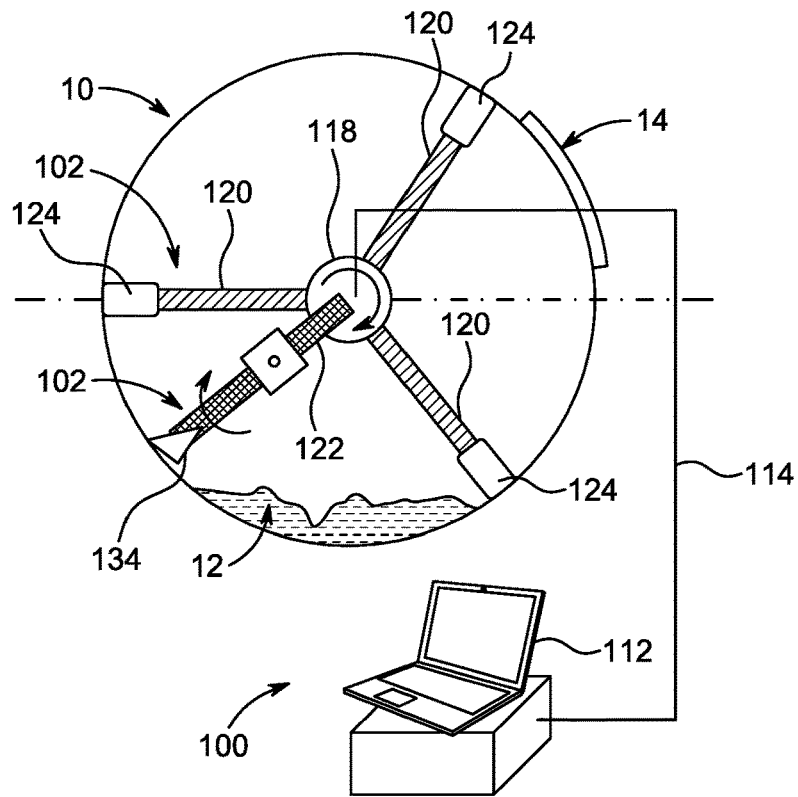
FIG. 7 is an exemplary front planar schematic of the vessel tank cleaning system during operation in the oil vessel, according to certain embodiments.

FIG. 6 and FIG. 7 illustrate the vessel tank cleaning system 100 in operation, with the robotic cleaner 102 being located inside the oil vessel (as represented by referenced numeral 10). The oil vessel 10, herein, may generally be in the form of a large cylindrical pipe of a circular circumference or rectangular circumference, with sufficient radius (along 'r') and length (along 'z') to accommodate the robotic cleaner 102 (which in itself could expand or contract, as discussed later, to move within the oil vessel 10 for its cleaning purposes). The oil vessel 10 includes an opening (manway 14), generally built for a human to enter for manual cleaning. The manway 14 is a way for the robotic cleaner 102 to enter the oil vessel 10 in the present disclosure. As discussed, the arm 122 of the robotic cleaner 102, in general, is implemented for cleaning purposes. Herein, a vacuum pipe and a spraying device (not shown for simplicity) are connected to the arm 122. The vacuum pipe may be configured for generating vacuum to suck out sludge (as represented by reference numeral 12 in FIGS. 6 and 7) for its effective removal from the interior of the oil vessel 10. The vacuum pipe, on the arm 122, enables the robotic cleaner 102 to not only dislodge but also efficiently evacuate the sludge 12 from the oil vessel 10, as may be required for thorough cleaning. The spraying device may be configured with applying cleaning agents such as water or specialized solvents to the interior surfaces of the oil vessel 10. Thereby, the spraying device may help with in breaking down stubborn residues in the sludge 12 and ensuring even distribution of cleaning agents across the surfaces of the oil vessel 10. In an example configuration, the vacuum pipe and the spraying device may form part of the cleaning sub-unit 134 of the arm 122, in the robotic cleaner 102, without departing from the spirit and the scope of the present disclosure. It may also be appreciated that the impurities generally consist of oil-based substances, sand, and small stones forms the sludge 12 in the oil vessel 10.

Further, the pump 116 (as shown in FIG. 6) may be configured for facilitating the movement of fluids to and from the arm 122 within the robotic cleaner 102. The integration of the pump 116 with the arm 122 is achieved through a set of hoses, specifically designed for their respective purposes. Herein, the pump 116 is connected to the arm 122 of the robotic cleaner 102 through a fluid hose 142 and a vacuum hose 144, passing through the manway 14 in the oil vessel 10. Specifically, the spraying device at the arm 122 of the robotic cleaner 102 is connected to the pump 116 through the fluid hose 142. In an embodiment, the inlet of the spraying device and the vacuum pipe are located at the intersection of the central unit 118 and the arm 122. Herein, a first end 142*a* of the fluid hose 142 is connected to the pump 116 and a second end 142*b* is connected to an inlet of the spraying device. The fluid hose 142 connects the pump 116 to the spraying device on the arm 122, for transporting the cleaning agents from the pump 116 to the spraying device. Further, the vacuum pipe at the arm 122 of the robotic cleaner 102 is connected to the pump 116 through the vacuum hose 144. Herein, a first end 144*a* of the vacuum hose 144 is connected to the pump 116 and a second end 144*b* is connected to the vacuum pipe 138. The vacuum hose 144 connects the pump 116 to the vacuum pipe, for removal of debris and liquids collected by the vacuum pipe away from the oil vessel 10. The pump 116 provides the driving force for the transportation of cleaning agents to the spraying device through the fluid hose 142, and the evacuation of dislodged materials of the sludge 12, via the vacuum pipe, and through the vacuum hose 144.

In an embodiment, the cleaning sub-unit 134 of the arm 122 comprises a scraper (as shown in FIG. 7 by a triangular structure at the cleaning sub-unit 134 of the arm 122) and a degreaser (not shown in the accompanied drawings). As discussed, in the vessel tank cleaning system 100, the cleaning sub-unit 134 of the arm 122 is specifically designed to handle the task of cleaning the interior surfaces of the oil vessel 10. The scraper, as part of the cleaning sub-unit 134, may have the primary function to physically dislodge and remove tough, adherent residues from surfaces of the oil vessel 10, such as hardened sludge, rust, and other forms of buildup that are difficult to remove. Further, the degreaser, as part of the cleaning sub-unit 134, may have the primary function to break down and remove oily and greasy residues, which are common in the oil vessel 10 (when used in industries like oil and gas). The use of degreaser may involve the application of chemical agents or solvents that dissolve or emulsify grease and oil, making them easier to remove. The degreaser may be a tube (or pipe) like structure attached to the arm 122, the tube (or pipe) filled with the chemical agent or solvents and having a capability to apply the chemical agent or solvents to the internal walls of the oil vessel 10. Thus, the combination of the scraper and the degreaser in the cleaning sub-unit 134 provides a comprehensive approach to cleaning of the oil vessel 10.

In the vessel tank cleaning system 100, as described earlier, the control unit 110 may include several sub-units that enhance the functionality and safety of the robotic cleaner 102. In an embodiment, as illustrated in FIG. 1, the control unit 110 comprises an energy management sub-unit 150 and a lighting sub-unit 152. The energy management sub-unit 150 is responsible for optimizing the energy consumption of the robotic cleaner 102. The energy management sub-unit 150 ensures that the robotic cleaner 102 operates efficiently, minimizing energy waste and extending the duration of cleaning operations. The lighting sub-unit 152 provides illumination within the oil vessel 10, aiding the operator to effectively navigate the robotic cleaner 102 for cleaning the oil vessel 10, particularly in low-light conditions typically found inside industrial tanks. In another embodiment, the control unit 110 comprises a decision support sub-unit 154 configured to perform fault checking of a plurality of components of the robotic cleaner 102. The decision support sub-unit 154 may continuously monitor the status of various components and identify any operational anomalies or faults. Herein, the decision support sub-unit 154 is further configured to isolate one or more components having a fault. That is, upon detecting the fault, the decision support sub-unit 154 is further configured to isolate the affected component(s), for maintaining the operational integrity of the robotic cleaner 102 and for preventing minor issues from escalating into major failures. In yet another embodiment, the control unit 110 comprises a safety check sub-unit 156 comprising an overheat protector and a short-circuit protector (not shown). Herein, the overheat protector may prevent the robotic cleaner 102 from overheating, which can be a significant risk given the electrical components and the potentially flammable environment in which the robotic cleaner 102 operates. Similarly, the short-circuit protector safeguards the robotic cleaner 102 against electrical faults, for preventing any electrical hazards. The control cable 114 extends from the control terminal 112 to the central unit 118, passing the oil vessel 10 through a manway 14 (which is in the form of an opening in the oil vessel 10). The sub-units of the control unit 118 are in communication with the control terminal 112, to send information collected by the sub-units to the control terminal 112 and to receive instructions from the control terminal 112. In an example, the decision support sub-unit 154 collects information on faults in the system, communicates the information from the control unit 110 (decision support sub-unit 154) to the control terminal 112. Based on the fault type or a degree of impact of the fault, an operator at the control terminal 112 can accordingly send back instructions to the decision support sub-unit 154 through the control cable 114 on isolation of the faults.

In the present disclosure, a general cleaning process is followed which includes inspection and cleaning of a vessel tank in oil and gas industry. General maintenance and inspection of the oil and gas plant are followed, which are isolating the oil vessel tank that requires cleaning, opening of all entry nozzles of the vessel tank, performing external/internal initial inspection, inspecting for hydro-jetting, removing any internals of the vessel tank such as, trays, filters, distributors, deflectors, vortex breaker depleted anodes, defective insulation kits of anode monitoring system (AMS), etc., weighing any content of the vessel tank, cleaning the internal space of the vessel tank using the robotic cleaner 102, repairing and replacing any components of the vessel tank as required, coating the internals, conducting a final inspection, seeking approval for closing manways, closing the vessel tank.

In the present disclosure, a method for cleaning the internal space of the vessel tank using the vessel tank cleaning system 100 is defined. A preliminary step of the method includes drainage of the contents of the vessel tank 10 such as, the oil and depressurizing the tank. Next step is to open manway of such a vessel tank 10 and enter the robotic cleaner 102 through the manway. The robotic cleaner 102 is then initialized and set to cleaning by the control unit 110 to perform hydro jetting using the fluid hose 142 connected to the arm 122 and the pump 116, and removing any sludge 12 using the arm 122 and other inputs such as demulsifier, liquid chemicals, and further suction the sludge through vacuum hose 142 or a drain of the vessel tank 10. The removal of sludge is performed as the robotic cleaner navigates through the entire internal space of the vessel tank by controlling movement of the robotic cleaner 102 through the control terminal 112, the control unit 110 and the monitoring unit 104. The robotic cleaner further performs steam cleaning with a degreaser connected to the arm 122. The robotic cleaner finally performs inspection of the vessel tank using the plurality of sensors 146, typically the image sensor and instructions from the control terminal 112. A few additional steps may be performed as part of the method for cleaning the internal space of the vessel tank, such as, drying of the internal space, and in-line scraping methods.

Figure 8:
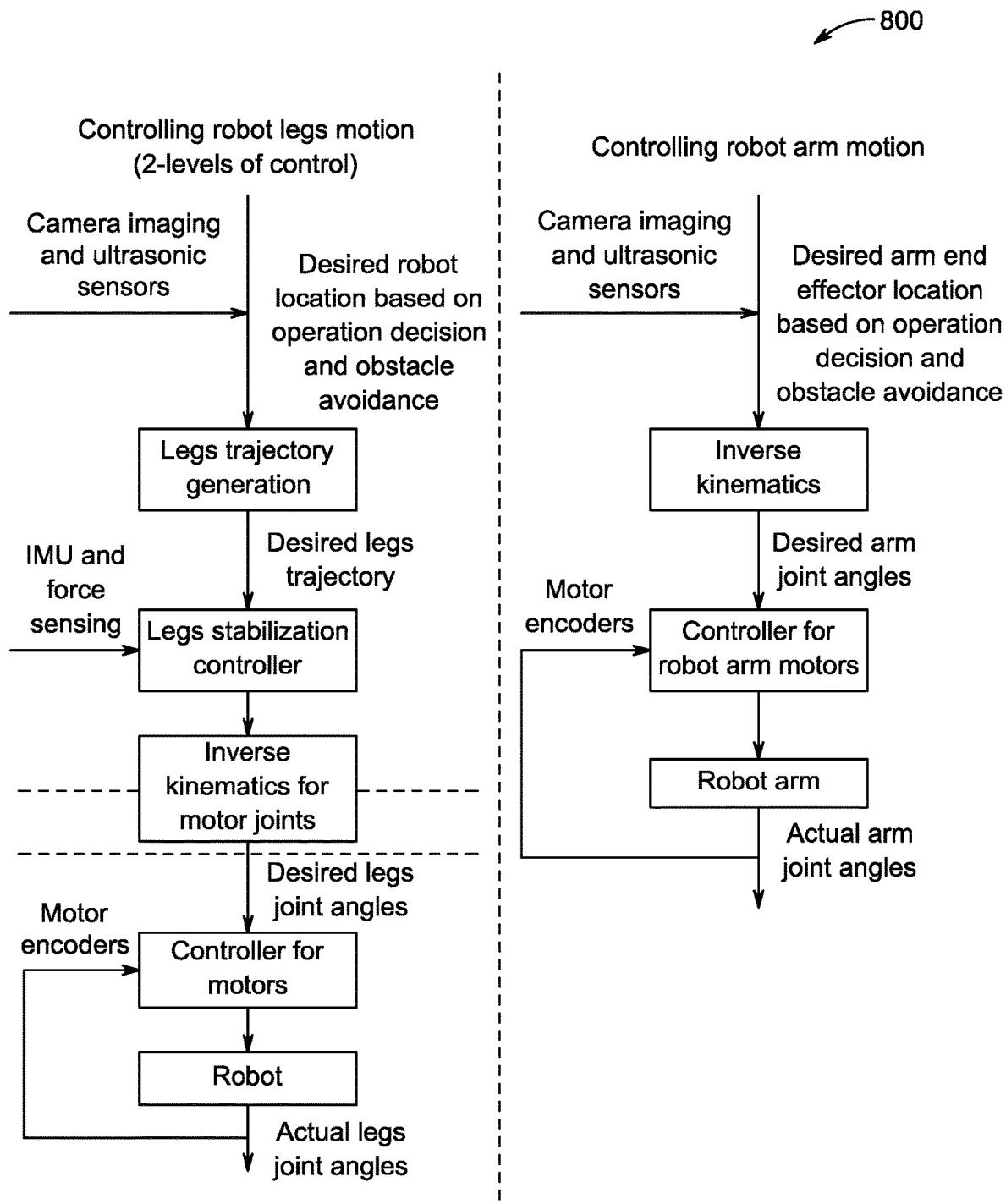
FIG. 8 is a flowchart depicting an exemplary control scheme for the robotic cleaner, according to certain embodiments.

Referring now to FIG. 8, illustrated is a flowchart (as represented by reference numeral 800) depicting an exemplary control scheme for the robotic cleaner 102, outlining the processes involved in both the translational motion of the central unit 118 using the retractable legs 120 and the motion of the arm 122 therein. For controlling motion of the retractable legs 120, a two-level control system may be implemented. At the upper level, camera imaging and ultrasonic sensors (of the plurality of sensors 146) of the monitoring unit 104 contribute to the determination of desired location of the robotic cleaner 102. The image sensors, inertial sensors, and IR sensors 146 gather visual and distance data, which inform the control unit 110 for an operation decision and obstacle avoidance strategy. In an example, the control unit 110 receives information from the plurality of sensors 146 of the monitoring unit 104. In an example, the processor 108 of the controller 106 of the monitoring unit 104 processes the information from the plurality of sensors 146 and generates instructions for the retractable legs 120. Based on this input, a trajectory for the retractable legs 120 is generated, creating a planned path that accounts for current tasks and the surrounding environment of the robotic cleaner 102. Simultaneously, an Inertial Measurement Unit (IMU) and force sensors 146 (of the monitoring unit 104) provide stabilization data to the leg stabilization controller 106 (of the monitoring unit 104). These sensors 146 detect the orientation of the robotic cleaner 102 and the forces acting upon it, allowing for real-time adjustments to maintain balance and stability. Further, at the lower control level, inverse kinematics for the motor joints of the retractable legs 120 are used to calculate the desired joint angles necessary for the retractable legs 120 to achieve the generated trajectory. The encoders 132 for the motors 130 then provide feedback to the controller 108 for motors 130, ensuring that the actual movement matches the desired trajectory. This feedback loop provides precision and allows the robotic cleaner 102 to adapt its movement in response to the physical constraints of the environment.

Controlling motion of the arm 122 for the robotic cleaner 102 involves a similar process as shown in FIG. 8. Camera imaging and ultrasonic sensors using image sensors 146 of the monitoring unit 104, input into the determination of the desired end effector location, again informed by operational decisions and the need for obstacle avoidance by controller 108 of the monitoring unit 104 and/or the control unit 110. Inverse kinematics are employed to determine the desired joint angles for the multiple joints of the arm 122 that will position the end effector at the required location. The encoders 132 provide positional feedback to the controller 108 and/or the control unit 110 for motors of the arm 122, to achieve the precise movement. This feedback ensures that motion of the arm 122 is accurate and the actual joint angles of the multiple joints of the arm 122 correspond to the desired angles calculated by the inverse kinematics. In both control processes, the actuators execute the commands from their respective controllers, driving the retractable legs 120 and the arm 122 to perform the necessary movements. This integrated control system enables the robotic cleaner 102 to navigate and clean effectively, adjusting its position and the position of its cleaning sub-unit 134 in response to the internal environment and any obstacles present in the oil vessel 10.

Figure 9:
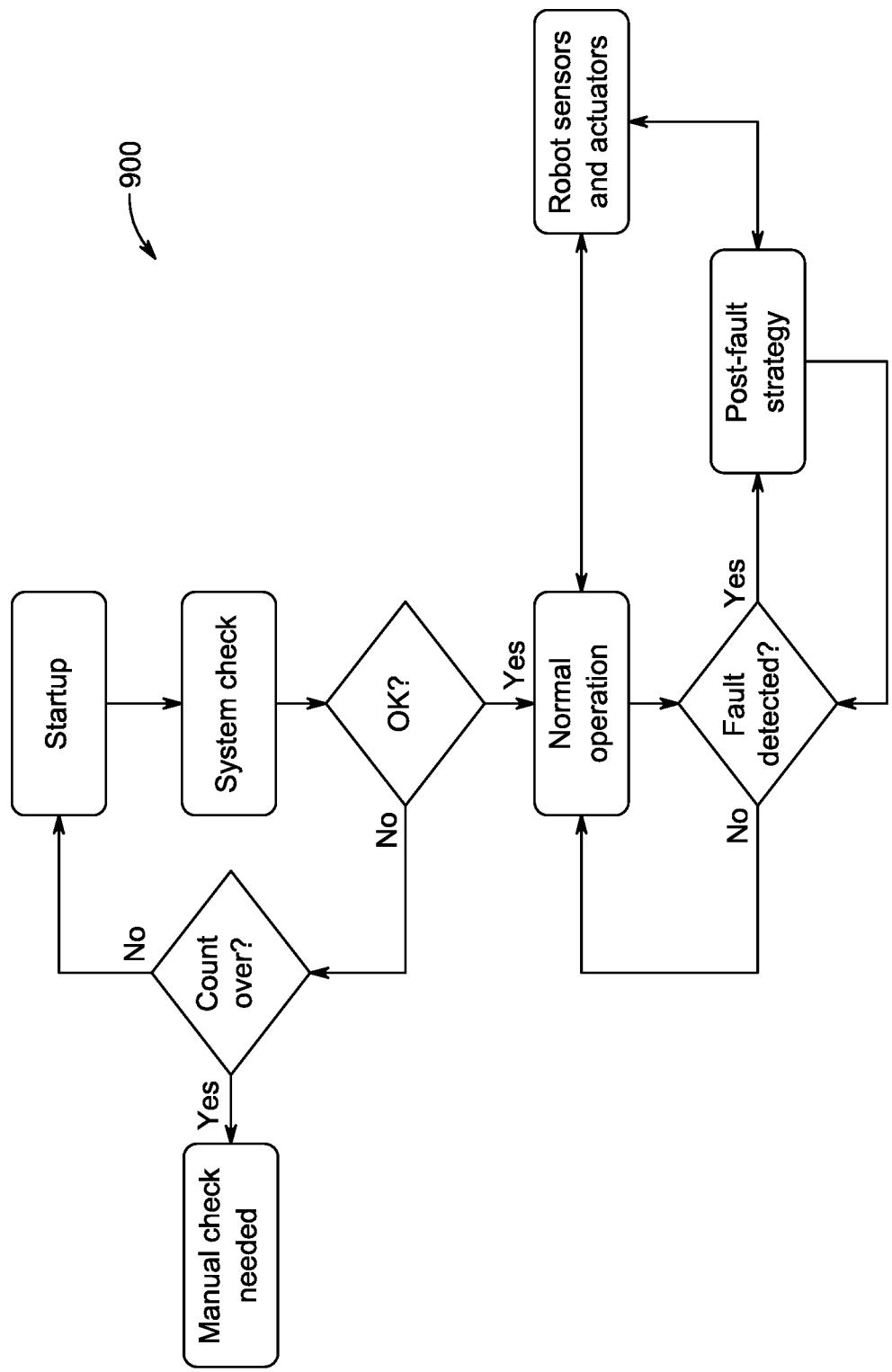
FIG. 9 is a flowchart depicting an exemplary decision-making strategy for the operational protocol of the robotic cleaner, according to certain embodiments.

Referring now to FIG. 9, illustrated is a flowchart (as represented by reference numeral 900) depicting an exemplary decision-making strategy for the operational protocol of the robotic cleaner 102. This strategy is integral to the functioning of the robotic cleaner 102, especially in ensuring efficient, safe, and autonomous operation. At startup, the robotic cleaner 102 initiates a system check to evaluate the health status of its components. If a manual check is deemed necessary, it is conducted before the count check, which determines if the system checks have been completed the required number of times. If the system check results are satisfactory, the robotic cleaner 102 transitions into normal operation mode. During normal operation, the robotic cleaner 102 continuously monitors its functionality through the decision support sub-unit 154, which is a high-level autonomous entity. The decision support sub-unit 154 utilizes inputs from various sensors and measuring instruments to assess the condition of the robotic cleaner 102. The decision support sub-unit 154 operates on pre-defined thresholds and critical time durations to activate, deactivate, or modify operation conditions for the robotic cleaner 102. If the decision support sub-unit 154 detects a fault during operation, it employs fault diagnosis algorithms to identify the issue. Upon fault detection, the decision support sub-unit 154 is programmed to isolate the affected component or operational mode. For instance, if a motor fails, the operations that rely on that motor are disabled, and a fault flag is raised. If the fault affects a non-critical component like a broom or mop, the system may either disable the specific cleaning mode or switch to a redundant tool. For example, an algorithm implemented by the decision support sub-unit 154 for the vessel tank cleaning system 100 of the present disclosure, specifically for the robotic cleaner 102 therein, is as shown in Table 1.

TABLE 1

Algorithm implemented by decision support sub-unit

| Algorithm steps | Process |
| --- | --- |
| Main Routine<br>START<br>InitiateRobot<br>SystemCheck<br>WaitForSystemCheck<br>If (SystemCheck == Okay)<br>  InitiateMount<br>Else<br>  StartupFail + +<br>If (StartupFail ≥ Threshold$_1$)<br>  StartupWarningOn<br>  RobotStandby<br>Else<br>  Goto: InitiateRobot | Robot is initiated, the robot controller is instructed to perform a system (robot) check: (1) On passing the system check, the robot is instructed to initiate mount; (2) On failing the system check, the fault is compared to a threshold; a warning is generated and robot is instructed to be on standby when fault is greater than threshold; Robot is initiated again when fault is less than threshold. |
| InitiateMount<br>WaitForMount<br>If (Mount == Okay)<br>  InitiateScan1<br>Else<br>  MountFail + +<br>If (MountFail ≥ Threshold$_2$)<br>  MountWarningOn<br>  RobotStandby<br>Else<br>  Goto: InitiateMount | Robot mount is initiated, initial scan is performed: (1) On successful mount, scan 1 is initiated; (2) If mount fails, fault is compared to threshold, warning is generated, and robot is on standby when fault is greater than threshold; mount is initiated again when fault is less than threshold. |
| WaitForScan1<br>If (Scan1 == Okay)<br>  InitiateCleaning<br>Else<br>  Scan1Fail + +<br>If (Scan1Fail ≥ Threshold$_3$)<br>  Scan1WarningOn<br>Else<br>  Goto: InitiateScan1 | Scan 1 is initiated: (1) If scan 1 is successful, robot is instructed to initiate cleaning; (2) If scan 1 fails, fault is compared to threshold, warning is generated, and robot is on standby when fault is greater than threshold; scan 1 is initiated again when fault is less than threshold. |
| WaitForCleaning<br>If (Cleaning == Okay)<br>  InitiateScan2<br>Else<br>  CleaningFail + +<br>If (CleaningFail ≥ Threshold$_4$)<br>  CleaningWarningOn<br>  RobotStandby<br>Else<br>  Goto: InitiateCleaning | Cleaning is initiated: (1) On successful cleaning, scan 2 is initiated; (2) If cleaning fails, fault is compared to threshold, warning is generated, and robot is on standby when fault is greater than threshold; cleaning is initiated again when fault is less than threshold. |

TABLE 1-continued

Algorithm implemented by decision support sub-unit

| Algorithm steps | Process |
|---|---|
| WaitForScan2<br>If (Scan2 == Okay)<br>   CompileCleaningReport<br>   InitiateShutdown<br>Else<br>   Scan2Fail + +<br>If (Scan2Fail ≥ $Threshold_5$)<br>   Scan2WarningOn<br>   RobotStandby<br>WaitForShutdown<br>If(ShutdownFail)<br>   ShutdownWarningOn<br>   RobotStandby<br>END | Scan 2 is initiated: (1) If scan 2 is successful, robot is instructed to generate report of complete cleaning and shutdown; (2) If scan 2 fails, fault is compared to threshold, warning is generated, and robot is on standby and wait for shutdown is initiated. If shutdown operation fails, warning is generated, and robot is on standby. |
| Interrupt Routine 1 (Fault Detection Identification and Reconfiguration)<br>for (AllSensorData)<br>   CheckRange<br>   If (OutOfRange)<br>   InititateFDIR<br>end for<br>END | Intermediate checks are performed for all sensors: (1) On successful check of all sensors, operation of robot is continued; (2) On detecting a failure of one or more sensors, a FDIR (Fault Detection Identification and Reconfiguration) routine is initiated. |
| Sub Routine FDIR<br>for (AllPreDefinedFaults)<br>   CheckPreCondition<br>   If (PreCondition == Satisfied)<br>   FaultFlagOn<br>   CheckReconfiguration<br>   If (Reconfiguration == Available)<br>   ActivateReconfiguration<br>end for<br>If (NoFaultFlag)<br>   UnknownFaultWarningOn<br>   RobotStandby<br>END | Initiation of FDIR, pre-defined fault check is performed for preconditions:<br>(1)Reconfiguration is performed when preconditions are successful; (2) Warning is generated, and robot is on standby. |
| Interrupt Routine 2 (Energy Management)<br>If (IdleTime ≥ $Threshold_6$)<br>   IdleWarningOn<br>RobotStandby | Intermediate check for energy management is performed: When robot is idle for a time longer than threshold, warning is generated, and robot is on standby. |
| Interrupt Routine 3 (Safety)<br>If (CurrentSensor<br>≥ $Threshold_7$ or CurrentSensor == NaN)<br>   EmergencyPowerCut | Intermediate check for safety is performed: When a sensor has a current value (1) higher than threshold or (2) Zero, emergency power cut is initiated. |

In the present disclosure, the decision-making strategy within normal operation and post-fault scenarios is optimized by a mix of model-based and rule-based decision policies. Model-based policies depend on the operational states and state transitions of the robotic cleaner 102, while rule-based policies are applied hierarchically for situations not covered by the model. For safety, the robotic cleaner 102 is equipped with systems like overheat protection and short-circuit protection, which are integrated parts of the onboard decision support system. These systems are designed to prevent damage to the robot and ensure safe operation within the potentially hazardous environment of the oil vessel 10. Energy management is another crucial function of the control unit 110. It conserves energy during operation by managing the duration of various operational modes and deactivating power supply to components not needed for the current mode. The system prevents overuse or inefficient use of energy, such as when a broom is detected cleaning the same spot for too long, by generating a warning and potentially interrupting operation if no change is detected within a specified time.

Figure 10:
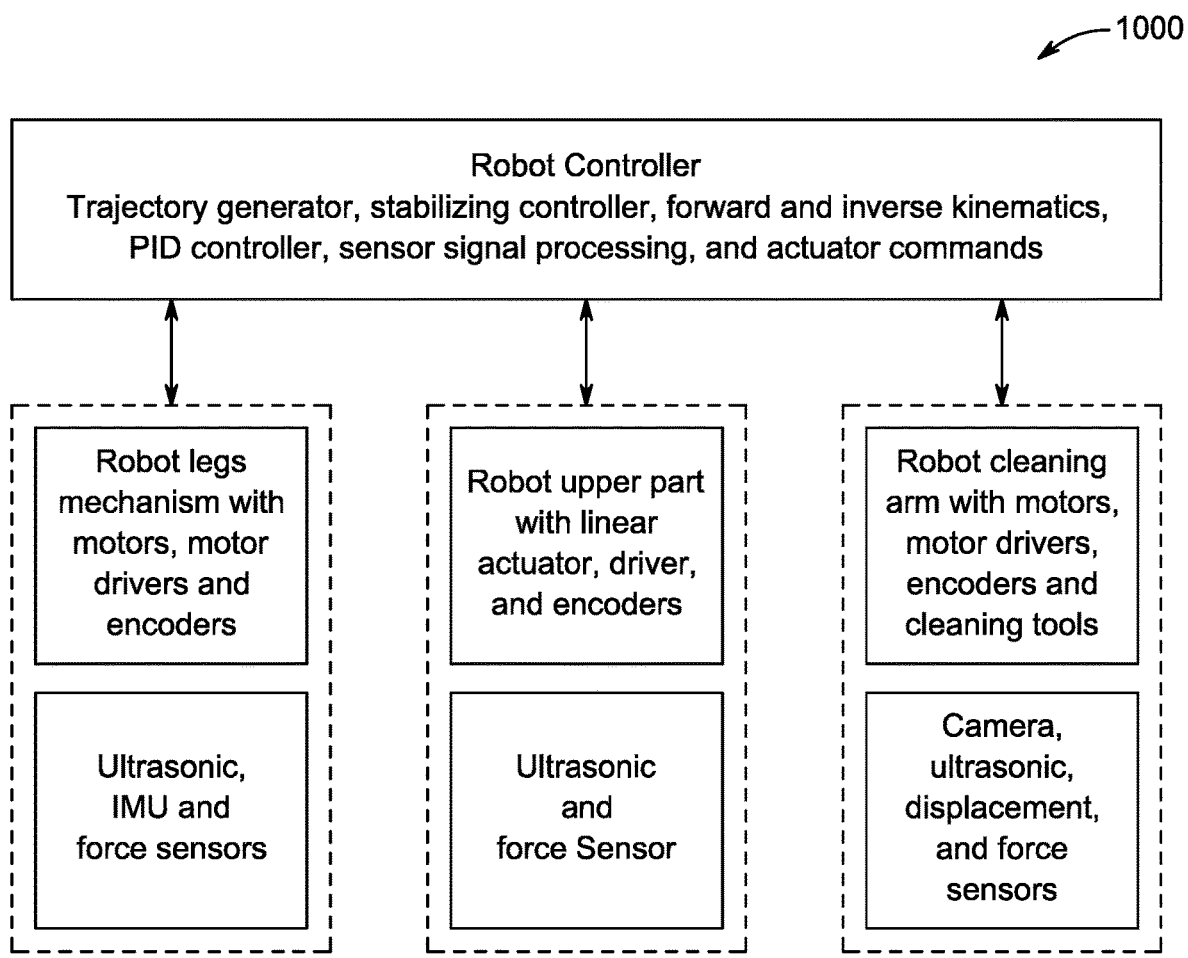
FIG. 10 is a schematic diagram depicting exemplary interactions between components of the robotic cleaner, according to certain embodiments.

Referring to FIG. 10, illustrated is a schematic (as represented by reference numeral 1000) depicting exemplary interactions between the controller 108 of the monitoring unit 104 and/or the control unit 110 and the mechanical parts, such as, the plurality of sensors 146, actuators, and motor drives of the robotic cleaner 102, for controlling the retractable legs 120 and the arm 122 thereof. The control of motion of the retractable legs 120 involves a high-level, two-layer operation. Initially, the trajectory generation for the retractable legs 120 is planned by a remote operator, for example, at the control terminal 112, who monitors interior of the oil vessel 10 using a camera (of image sensor of plurality of sensors 146) installed on the arm 122. The operator selects a location for the robotic cleaner 102 to reach, and this input is received from the control terminal 112 by the control unit 110. To navigate the robotic cleaner 102 to the desired location, the control unit 110 generates motion trajectories for all three retractable legs 120, ensuring coordinated movement and communicates the motion trajectories to the controller 108 of the monitoring unit 104. The processor 106 of the controller 108 accordingly generates instructions for the retractable legs 120 and the arm 122. During this process, data from ultrasonic sensors 146 on the retractable legs 120 is used to adjust the motion trajectories, avoiding obstacles, and ensuring feasible movement. Concurrently, the stabilization control for the retractable legs 120 maintains balance for the robotic cleaner 102. The gait for the retractable legs 120, involving the sequence of lifting and placing, is adjusted to keep the robotic cleaner 102 steady during both movement and cleaning operations. Stability is managed by the stabilization controller for the retractable legs 120, which processes measurements from force sensors and IMUs indicating the tilt angles of the retractable legs 120.

Subsequently, the low-level control takes over, utilizing the inverse kinematics of the retractable legs 120 to calculate the desired joint angles for the motors 130 therein. A PID controller at the control unit 110 generates commands for the motors 130 via the monitoring unit 104 adjusting the motors 130 to achieve these angles. Feedback from the IMUs and force sensors 146, resulting from the motion, is provided to the high-level stabilization controller of the control unit 110 to refine the stability process. The upper part of the retractable legs 120, which includes a telescopic linear actuation mechanism, extends to anchor itself onto surfaces of the oil vessel 10. A force sensor 146 and the control unit 110 at the end of this mechanism ensures that the necessary holding force is applied to maintain position of the robotic cleaner 102 during operation.

Further, the control of the arm 122 using the control unit 110, a multiple-joint limb (up to four-joint limb) with 360° rotation capability, follows a procedure where the operator at the control terminal 112 selects the desired end-effector configuration for the cleaning task. The control unit 110 receives this input from the control terminal 112 via the control cable 114 and processes it, with ultrasonic sensors 146 of the monitoring unit 104 ensuring a clear path. The motion of the arm 122 is managed through inverse kinematics calculations for the joint angles of the multiple joints of the arm 122 and a PID feedback controller of the control unit 110 that sends precise commands to its motors. A force sensor 146 at the end-effector ensures the application of sufficient force for cleaning, while feedback from a displacement sensor 146 is used to attain the desired motion of the end effector, facilitating the cleaning operation.

The vessel tank cleaning system 100 of the present disclosure provides several advantages over the existing manual and semi-automated cleaning methods. The automation of the cleaning process significantly reduces the need for human intervention, thereby minimizing the risks associated with manual cleaning in hazardous environments. The design of the vessel tank cleaning system 100, featuring the robotic cleaner 102 with the retractable legs 120 and the arm 122, provides required reach and maneuverability, ensuring a thorough and efficient cleaning process. The use of omni directional wheels 124 in the retractable legs 120 allows for smooth and versatile movement within the oil vessel 10, a significant improvement over the limited mobility of traditional cleaning methods. The integration of the sensors 146 in the monitoring unit 104 provides a level of situational awareness and operational precision that is unattainable with manual or semi-automated systems. Moreover, the advanced control mechanisms 150-156 within the control unit 110, ensure a high degree of reliability and safety, enhancing ability of the vessel tank cleaning system 100 to adapt to different cleaning scenarios and further improving its effectiveness compared to traditional methods.

Figure 11:
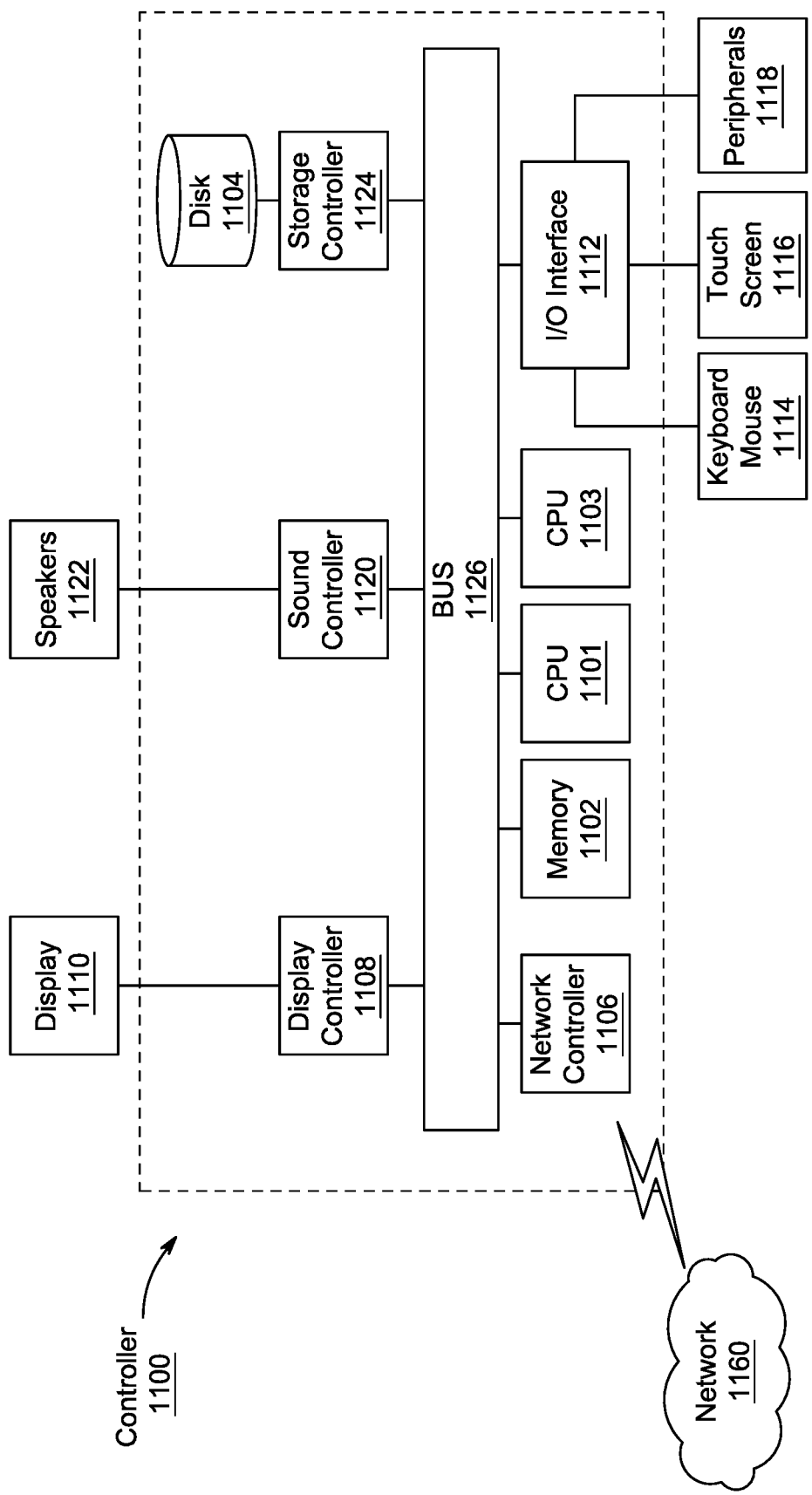
FIG. 11 is an illustration of a non-limiting example of details of computing hardware used in the computing system, according to certain embodiments.

Further details of the hardware description of the computing environment according to exemplary embodiments is described with reference to FIG. 11. In FIG. 11, a controller 1100 is described as representative of control systems for the vessel tank cleaning system 100 in which the controller 1100 is a computing device which includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1101, 1103 and an operating system such as Microsoft Windows 7, Microsoft Windows 10, Microsoft Windows 11, UNIX, Solaris, LINUX, Apple MAC-OS, and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
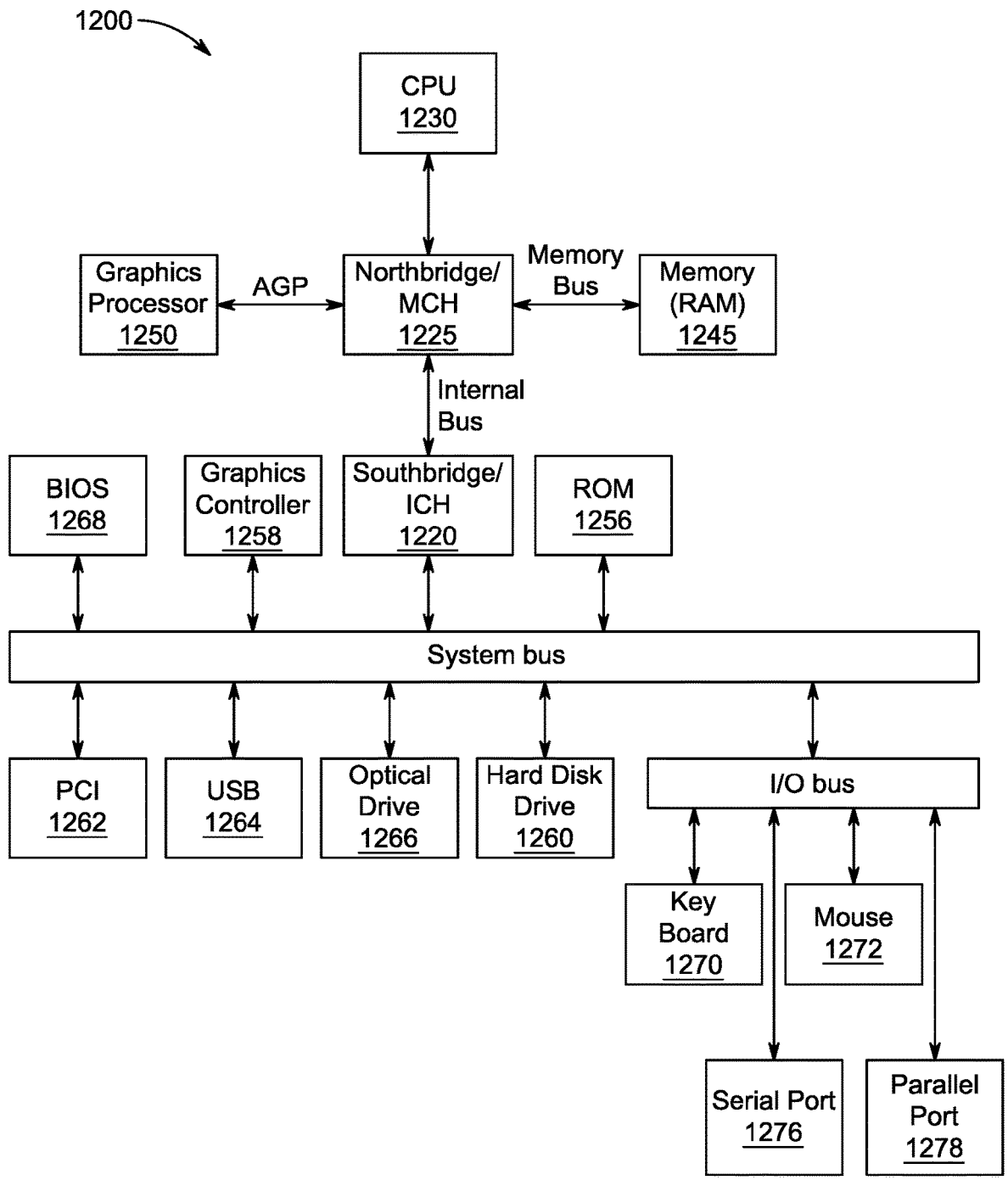
FIG. 12 is an exemplary schematic diagram of a data processing system used within the computing system, according to certain embodiments.

FIG. 12 shows a schematic diagram of a data processing system, according to certain embodiments, for performing the functions of the exemplary embodiments. The data processing system is an example of a computer in which code or instructions implementing the processes of the illustrative embodiments may be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
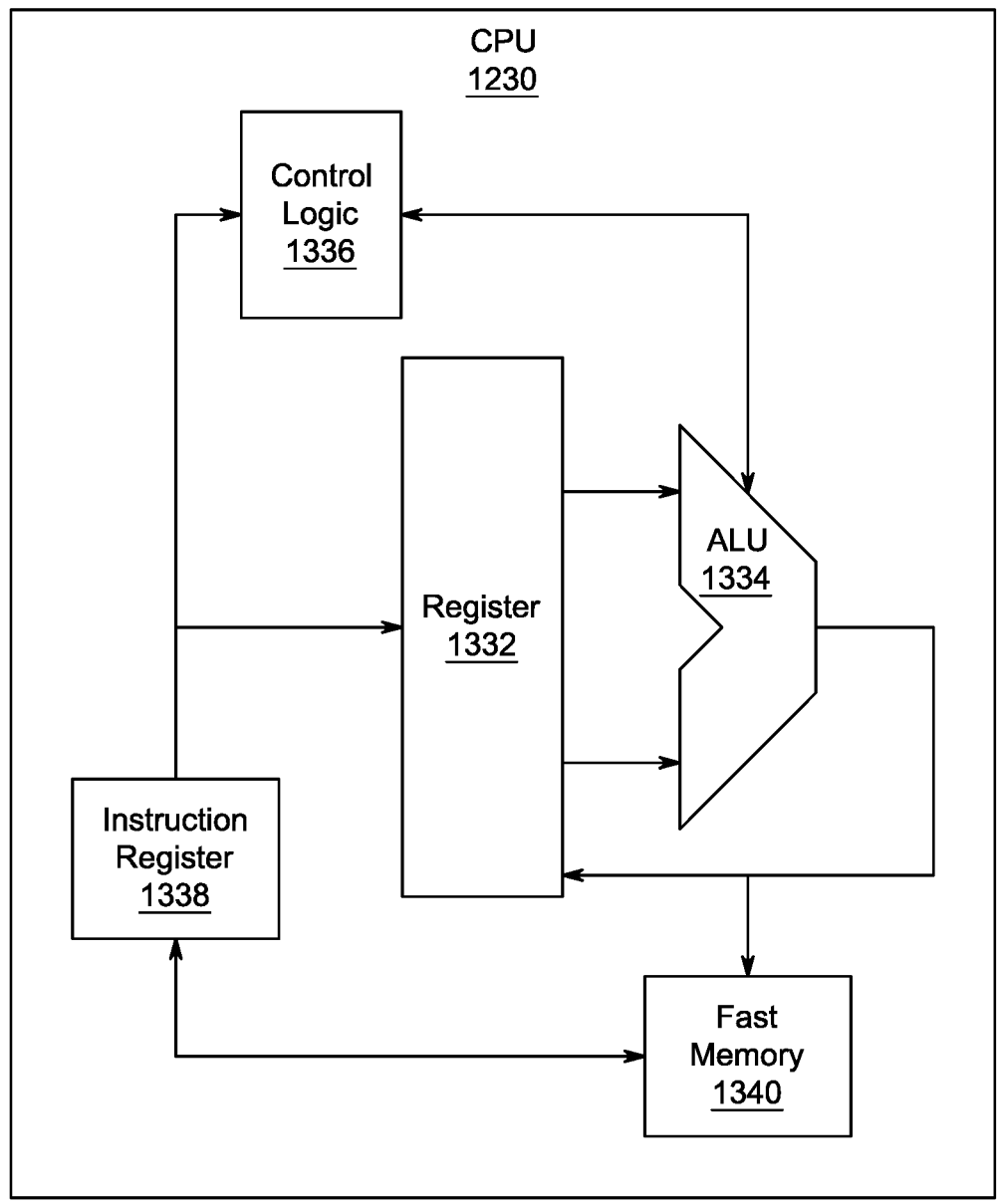
FIG. 13 is an exemplary schematic diagram of a processor used with the computing system, according to certain embodiments.

For example, FIG. 13 shows one implementation of CPU 1230. In one implementation, the instruction register 1338 retrieves instructions from the fast memory 1340. At least part of these instructions are fetched from the instruction register 1338 by the control logic 1336 and interpreted according to the instruction set architecture of the CPU 1230. Part of the instructions can also be directed to the register 1332. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain implementations, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1288 through a PCI bus 1262.

The PCI devices may include, for example, Ethernet adapters, add-in cards, and PC cards for notebook computers. The Hard disk drive 1260 and CD-ROM 1266 can use, for example, an integrated drive electronics (IDE) or serial advanced technology attachment (SATA) interface. In one implementation the I/O bus can include a super I/O (SIO) device.

Further, the hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 14:
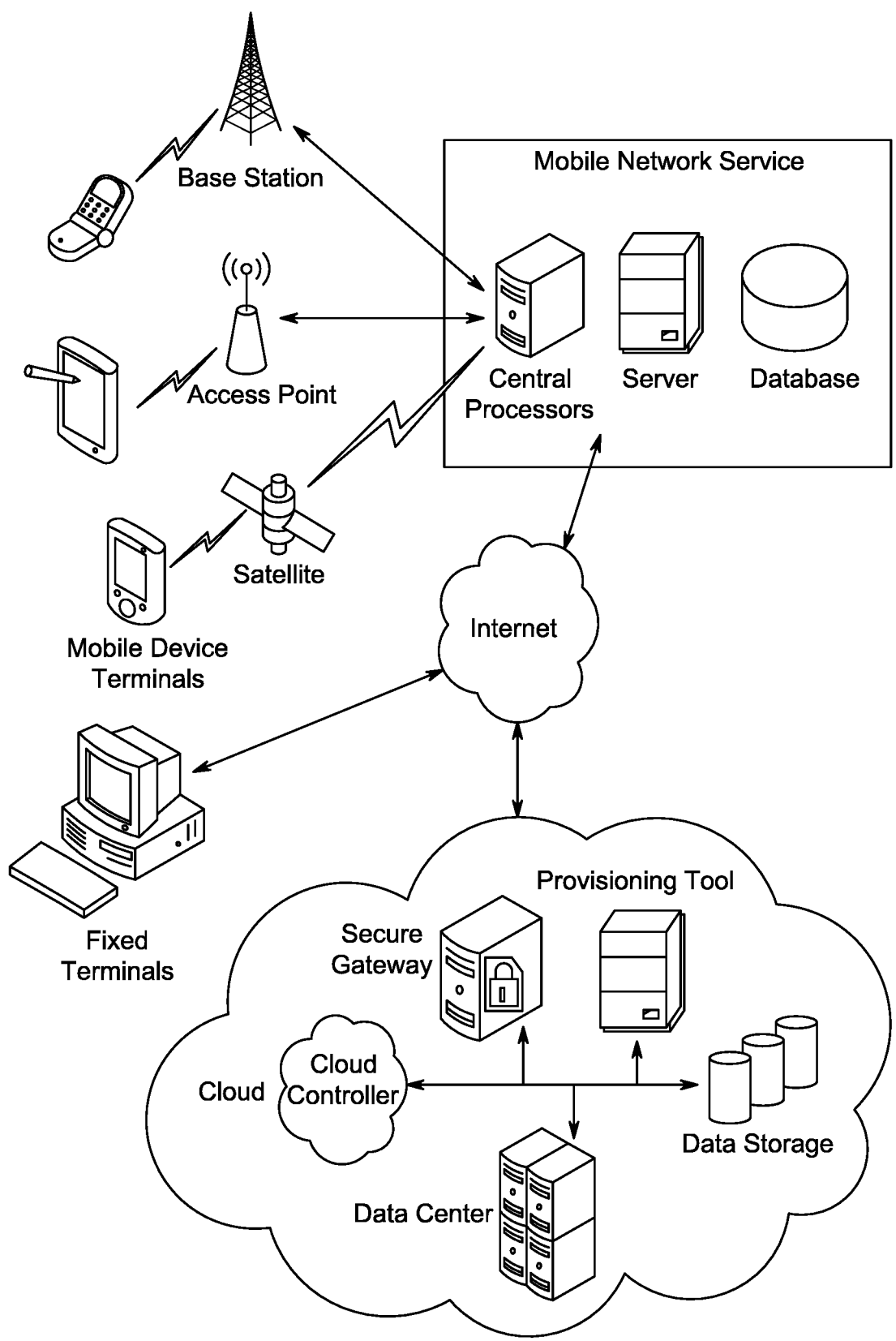
FIG. 14 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A vessel tank cleaning system, comprising:
    a robotic cleaner, comprising:
        a cylindrical central unit;
        three retractable legs extending from the cylindrical central unit, wherein the three retractable legs are in a tandem arrangement, wherein each of the three retractable legs comprises an omni directional wheel at a distal end, a leg collar at an end proximal to the cylindrical central unit, up to three joints and a motor;
        an arm extending from the cylindrical central unit configured to rotate about the cylindrical central unit, wherein the arm comprises a cleaning sub-unit at a distal end and an arm collar at an end of the arm proximal to the cylindrical central unit, and wherein a vacuum pipe and a spraying device are connected to the arm;
        wherein the leg collar of each the three retractable legs and the arm collar of the arm are positioned over the cylindrical central unit, wherein each of the three retractable legs and the arm are attached to the cylindrical central unit by the respective leg collar and arm collar;

a monitoring unit integrated in the three retractable legs and the arm, the monitoring unit comprising a plurality of sensors, wherein the monitoring unit includes a controller having a processor with instructions configured to monitor an operation of the robotic cleaner; and a control unit integrated in the cylindrical central unit and in communication with the controller of the monitoring unit, wherein the processor is configured with instructions to communicate a set of information from the plurality of sensors with the control unit, wherein the control unit is configured to communicate to the controller of the monitoring unit to control movement of the robotic cleaner based on the set of information from the plurality of sensors;

a control terminal configured to communicate a set of commands with the control unit of the robotic cleaner through a control cable, wherein the control cable is connected between the control terminal and the cylindrical central unit; and a pump connected to the arm of the robotic cleaner through a fluid hose and a vacuum hose.

2. The vessel tank cleaning system of claim 1, wherein the motor on each of the three retractable legs of the robotic cleaner is coupled to an encoder.

3. The vessel tank cleaning system of claim 2, wherein the control unit of the robotic cleaner is configured to communicate with the encoder for a movement of the robotic cleaner.

4. The vessel tank cleaning system of claim 1, wherein the plurality of sensors of the monitoring unit includes one or more force sensors integrated in each of the three retractable legs of the robotic cleaner.

5. The vessel tank cleaning system of claim 1, wherein the plurality of sensors of the monitoring unit comprises a set of inertial sensors, wherein the inertial sensors are integrated in the three retractable legs and configured to generate an orientation of each of the three retractable legs, and wherein the processor is further configured with instructions to monitor the orientation of one or more of the three retractable legs.

6. The vessel tank cleaning system of claim 1, wherein the plurality of sensors of the monitoring unit comprises an image sensor integrated in the arm of the robotic cleaner, and wherein the processor is further configured with instructions to monitor a position of the arm with a set of images generated by the image sensor.

7. The vessel tank cleaning system of claim 1, wherein the plurality of sensors of the monitoring unit comprises a set of displacement sensors integrated in the three retractable legs and the arm of the robotic cleaner, wherein the displacement sensors are configured to generate a location data of each of the three retractable legs and the arm of the robotic cleaner, and wherein the processor is further configured with instructions to monitor a movement of the robotic cleaner with the generated location data.

8. The vessel tank cleaning system of claim 1, wherein the plurality of sensors of the monitoring unit comprises a set of IR sensors.

9. The vessel tank cleaning system of claim 1, wherein the arm of the robotic cleaner comprises four joints, wherein each joint is configured to bend at an angle.

10. The vessel tank cleaning system of claim 1, wherein the arm and each of the three retractable legs are configured to rotate around a central axis of the cylindrical central unit to up to 360 degrees.

11. The vessel tank cleaning system of claim 1, wherein the cleaning sub-unit of the arm comprises a scraper and a degreaser.

12. The vessel tank cleaning system of claim 1, wherein the spraying device at the arm of the robotic cleaner is connected to the pump through the fluid hose, wherein a first end of the fluid hose is connected to the pump and a second end is connected to an inlet of the spraying device.

13. The vessel tank cleaning system of claim 1, wherein the vacuum pipe at the arm of the robotic cleaner is connected to the pump through the vacuum hose, wherein a first end of the vacuum hose is connected to the pump and a second end is connected to the vacuum pipe.

14. The vessel tank cleaning system of claim 1, wherein the cylindrical central unit of the robotic cleaner is an elongated cylindrical unit centered at an axis, with the three retractable legs and the arm extending from the elongated cylindrical unit along the axis.

15. The vessel tank cleaning system of claim 1, wherein the cylindrical central unit of the robotic cleaner comprises an actuator.

16. The vessel tank cleaning system of claim 1, wherein the control unit comprises an energy management sub-unit and a lighting sub-unit.

17. The vessel tank cleaning system of claim 1, wherein the control unit comprises a decision support sub-unit configured to perform fault checking of a plurality of components of the robotic cleaner.

18. The vessel tank cleaning system of claim 17, wherein the decision support sub-unit is further configured to isolate one or more components having a fault.

19. The vessel tank cleaning system of claim 1, wherein the control unit comprises a safety check sub-unit comprising an overheat protector and a short-circuit protector.

20. The vessel tank cleaning system of claim 1, wherein the control terminal is configured to have a two-way communication with the control unit.

* * * * *